United States Patent
Mourzagh et al.

(10) Patent No.: US 12,412,899 B2
(45) Date of Patent: Sep. 9, 2025

(54) ELECTROCHEMICAL ACCUMULATOR WITH BIPOLAR ARCHITECTURE INCLUDING A SPECIFIC STRUCTURE

(71) Applicants: COMMISSARIAT À L'ÉNERGIE ATOMIQUE ET AUX ÉNERGIES ALTERNATIVES, Paris (FR); SOLVAY FRANCE, Aubervilliers (FR)

(72) Inventors: Djamel Mourzagh, Grenoble (FR); Julio Abusleme, Saronno (IT); Gaëlle Besnard, Grenoble (FR); Marc-David Braida, Bry sur Marne (FR); Elise Gutel, Grenoble (FR); Hélène Rouault, Grenoble (FR); Daniel Tomasi, Grenoble (FR)

(73) Assignees: COMMISSARIAT À L'ÉNERGIE ATOMIQUE ET AUX ÉNERGIES ALTERNATIVES, Paris (FR); SOLVAY FRANCE, Aubervilliers (FR)

(*) Notice: Subject to any disclaimer, the term of this patent is extended or adjusted under 35 U.S.C. 154(b) by 1042 days.

(21) Appl. No.: 17/258,855

(22) PCT Filed: Jul. 10, 2019

(86) PCT No.: PCT/FR2019/051733
§ 371 (c)(1),
(2) Date: Jan. 8, 2021

(87) PCT Pub. No.: WO2020/012123
PCT Pub. Date: Jan. 16, 2020

(65) Prior Publication Data
US 2021/0328226 A1   Oct. 21, 2021

(30) Foreign Application Priority Data
Jul. 11, 2018 (FR) .................................. 1856389

(51) Int. Cl.
H01M 4/62 (2006.01)
H01M 10/04 (2006.01)
(Continued)

(52) U.S. Cl.
CPC ....... H01M 4/623 (2013.01); H01M 10/0525 (2013.01); H01M 10/0565 (2013.01);
(Continued)

(58) Field of Classification Search
CPC ............ H01M 4/623; H01M 10/0525; H01M 10/0565; H01M 10/0568; H01M 10/0569;
(Continued)

(56) References Cited

U.S. PATENT DOCUMENTS 7,097,937 B2   8/2006   Fredriksson et al.
7,220,516 B2   5/2007   Oosawa et al.
(Continued)

FOREIGN PATENT DOCUMENTS

WO   03047021 A2   6/2003
WO   2017017023 A1   2/2017
WO   2017089454 A1   6/2017

OTHER PUBLICATIONS

International Search Report for PCT/FR2019/051733 dated Sep. 11, 2019.
(Continued)

Primary Examiner — Christian Roldan
(74) Attorney, Agent, or Firm — Chrisman Gallo Tochtrop LLC

(57) ABSTRACT

An accumulator with a bipolar architecture that comprises two terminal current collectors, between which a stack of n electrochemical cells is disposed, with n being an integer at least equal to 2, wherein: —each electrochemical cell comprises a positive electrode, a negative electrode and an ion conducting membrane that is interposed between the posi-
(Continued)

tive electrode and the negative electrode and comprises a liquid electrolyte included in the electrodes and the ion conducting membrane; —the n electrochemical cells are separated from each other by n−1 bipolar current collectors; wherein the positive electrode and the negative electrode of each electrochemical cell are gel electrodes comprising a composite material comprising a polymeric matrix made of at least one gelling polymer (FF), an active electrode material and optionally one or more electronic conductive additives, the polymeric matrix trapping the liquid electrolyte.

21 Claims, 4 Drawing Sheets

(51) Int. Cl.
  *H01M 10/0525* (2010.01)
  *H01M 10/0565* (2010.01)
  *H01M 10/0568* (2010.01)
  *H01M 10/0569* (2010.01)
  *H01M 10/0585* (2010.01)

(52) U.S. Cl.
  CPC ... *H01M 10/0568* (2013.01); *H01M 10/0569* (2013.01); *H01M 10/0585* (2013.01); *H01M 2300/0085* (2013.01); *H01M 2300/0091* (2013.01)

(58) Field of Classification Search
  CPC ..... H01M 10/0585; H01M 2300/0085; H01M 2300/0091; H01M 10/0413; H01M 10/0418; H01M 10/044; H01M 2004/023; H01M 2004/029; Y02E 60/10; Y02P 70/50
  USPC ........................................................ 429/341
  See application file for complete search history.

(56) References Cited

U.S. PATENT DOCUMENTS

| | | | |
|---|---|---|---|
| 2008/0131776 A1* | 6/2008 | Sakuma | H01M 4/623 525/199 |
| 2009/0159582 A1* | 6/2009 | Chami | H01M 10/044 29/623.5 |
| 2010/0133482 A1* | 6/2010 | Abusleme | C08F 214/225 252/511 |
| 2011/0059365 A1* | 3/2011 | Meehan | H01M 10/0585 429/231.95 |
| 2013/0101903 A1* | 4/2013 | Barchasz | H01M 4/382 429/188 |
| 2014/0079992 A1 | 3/2014 | Tanaka | |
| 2015/0140473 A1* | 5/2015 | Abusleme | H01M 8/1051 429/316 |
| 2015/0213968 A1 | 7/2015 | Kitaguchi et al. | |
| 2017/0222228 A1* | 8/2017 | Imazaki | C01G 53/50 |

OTHER PUBLICATIONS

Search Report for French application No. FR1856389 dated Feb. 13, 2019.

* cited by examiner

ELECTROCHEMICAL ACCUMULATOR WITH BIPOLAR ARCHITECTURE INCLUDING A SPECIFIC STRUCTURE

CROSS-REFERENCE TO RELATED APPLICATIONS

This is a National Stage application of PCT international application PCT/FR2019/051733, filed on Jul. 10, 2019, which claims the priority of French Patent Application No. 1856389, filed Jul. 11, 2018, both of which are incorporated herein by reference in their entirety.

TECHNICAL FIELD

The invention relates to the field of electrochemical accumulators with bipolar architecture including a specific structure not requiring in particular the fitting of seals at adjacent cells forming these accumulators.

The general field of the invention can be defined as that of energy storage devices, in particular that of electrochemical accumulators.

PRIOR ART

Electrochemical accumulators function on the principle of electrochemical cells able to deliver an electric current by virtue of the presence in each of them of a pair of electrodes (respectively a positive electrode and a negative electrode) separated by an electrolyte, the electrodes comprising specific materials able to react in accordance with an oxidation-reduction reaction, by means of which there is a production of electrons giving rise to the electric current and productions of ions that will travel from one electrode to the other by means of an electrolyte.

Among the accumulators subscribing to this principle, mention can be made of:
  lead acid accumulators using lead and lead oxide $PbO_2$ as active electrode materials;
  Ni-MH accumulators using a metal hydride and nickel oxyhydroxide as active electrode materials;
  accumulators using nickel or a nickel-based compound to constitute the active material of at least one of the electrodes, such as Ni-MH accumulators using in particular a metal hydride and nickel oxyhydroxide as active electrode materials; Ni—Cd accumulators using cadmium and nickel oxyhydroxide as active electrode materials or nickel-zinc accumulators using nickel hydroxide and zinc oxide as active electrode materials; and
  accumulators functioning on the principle of insertion-deinsertion of an alkaline or alkaline-earth element acting at the electrodes (and more specifically at the active electrode materials), accumulators subscribing to this principle and used currently being accumulators of the lithium-ion type using, in whole or in part, lithium materials to constitute the active electrode materials.

A few years ago, these Li-ion accumulators ousted the other accumulators mentioned above because of the continuous improvement in the performance of Li-ion accumulators in terms of energy density. This is because lithium-ion accumulators make it possible to obtain energy densities in terms of mass and volume (which may be greater than 180 $Wh \cdot kg^{-1}$) appreciably superior to those of Ni-MH and Ni—Cd accumulators (which may range from 50 and 100 $Wh \cdot kg^{-1}$) and lead acid accumulators (which may range from 30 to 35 $Wh \cdot kg^{-1}$).

At the present time, the market for lithium-ion accumulators is dominated by a so-called "monopolar" architecture, that is to say an architecture wherein an accumulator includes only one electrochemical cell that uses, for example, a positive electrode based on lithium cobalt oxide ($LiCoO_2$) and a negative electrode based on graphite, separated from each other by an electrolyte conducting of lithium ions, the nominal voltage of these accumulators being around 3.6 V.

With such an architecture, in order to obtain a high voltage, it is therefore necessary to associate in series a plurality of single-cell accumulators via external connections.

In contrast to this monopolar architecture, a new generation of accumulators with so-called bipolar architecture has been the subject of studies for several years.

Accumulators with bipolar architecture comprise, as illustrated in the accompanying FIG. 1, two end current-collecting substrates 1, 3 and a stack of electrochemical cells ($C_1$, $C_2$, ..., $C_n$) that each comprise a positive electrode 5, a negative electrode 7 and a separator 9 interposed between the positive electrode and the negative electrode in the presence of an electrolyte conducting of lithium ions, when the accumulator is a lithium-ion accumulator, a stack wherein the electrochemical cells are separated from each other by a current-collecting substrate, referred to as a bipolar current-collecting substrate 11, which is in the form of a foil, one face of which is in contact with the negative electrode of an electrochemical cell while the other face is in contact with the positive electrode of the adjacent electrochemical cell.

Bipolar architecture thus corresponds to putting a plurality of accumulators in series by means of so-called bipolar current collecting substrates, which makes it possible to dispense with the external connections that are necessary for assembling monopolar accumulators in series. It therefore leads to systems that are lighter than those resulting from an assembly of monopolar accumulators in series, thus increasing the energy density. In addition, depending on the number of cells constituting the stack, the final voltage of the accumulator can easily be adjusted and may be very high, if desired.

Nevertheless, the essential problem of bipolar technology lies in the difficulty of confining the liquid electrolyte in each cell in order to have an assembly including cells in series that are identical while remaining independent of each other. This is because, if the liquid electrolyte contained in a cell does not remain confined therein but expands into the adjacent cells, there may occur a phenomenon of ionic short-circuit that may cause imbalance in the stack and in particular defectiveness of all or some of the cells, thus causing rapid degradation of the assembly.

In order to avoid these drawbacks, sealing may be provided by creating a physical barrier to the movement of the electrolyte, this physical barrier being able to be obtained, for example, by the following means:
  a seal made from a thermoset resin of the epoxy resin type, or an adhesive of the acrylic adhesive type, which is deposited on the periphery of the stack of electrochemical cells as described, for example, in the international application PCT WO 03/047021 and illustrated in FIG. 1 by the reference 13;

an adhesive film, supple and flexible, bonded to the periphery of the bipolar current collectors, as described in the U.S. Pat. No. 7,220,516;

a fluorinated polymer barrier lined with fluidtight seal made from a polymer that is arranged outside this barrier, provided at the periphery of the bipolar current collectors as described in the U.S. Pat. No. 7,097,937.

However, the use of a physical barrier to the diffusion of a liquid electrolyte is not completely satisfactory since none of them completely withstands the electrolyte solvents normally used in liquid electrolytes, which may in the end cause ionic short-circuits.

Another alternative could consist of dispensing with the use of a liquid electrolyte, replacing it, for example, with the following solutions:

a glass or a ceramic conducting of lithium ions in a purely solid form, for example a thin layer deposited by chemical vapour deposition (CVD) such as a layer of LIPON, or a layer of a composite material comprising a polymer matrix, for example made from polyvinylidene fluoride, and a filler consisting of a lithium oxide, such as $Li_7La_3Zr_2O_{12}$;

a dry solid electrolyte composed of a polymer of the polyethylene oxide (POE) type and a lithium salt, for example lithium trifluorosulfonylimide (LiTFSI).

However, these various solutions at the present time all have a certain number of drawbacks.

Concerning the use of glass or ceramic that are conducting of lithium ions, this requires implementation or synthesis techniques that are very complex to develop in an industrial context, which may prove to be prohibitive for the production of accumulators on a large scale.

Concerning dry solid electrolytes, the ionic conductivity thereof is generally less than $10^{-5}$ S·cm$^{-1}$, whereas, for a conventional liquid electrolyte, the ionic conductivity is around $10^{-3}$ S·cm$^{-1}$, or even $10^{-2}$ S·cm$^{-1}$ at ambient temperature. In fact, it may prove necessary to use the accumulators including dry electrolyte at higher temperatures than ambient temperature, for example a temperature ranging from 60 to 80° C. in order to assist the diffusion of the lithium ions in the electrolyte.

Finally, concerning the ion-conducting membranes used at the present time, it is not possible to completely dispense with the use of an impervious resin at the periphery of the electrochemical cells in order to ensure the impermeability of the whole.

In the light of the existing solutions and the drawbacks stemming from the use thereof, the inventors have therefore set themselves the objective of proposing novel accumulators with bipolar architecture using a liquid electrolyte but the leakage of which is checked without needing to have recourse to the use of a physical barrier to the flow, such as seals disposed at the periphery of the electrochemical cells. Moreover, the inventors have set themselves the objective of proposing novel accumulators with bipolar architecture having, apart from excellent confinement of the electrolyte, electrochemical performance that is effective and stable even after a large number of operating cycles (or in other words charging-discharging cycles).

DESCRIPTION OF THE INVENTION

The authors of the present invention have been able to achieve the aforementioned objectives by installing, in accumulators with bipolar architecture, gelled electrodes that make it possible to confine a liquid electrolyte without impairing the conductivity properties thereof and without risk of a leakage thereof.

The accumulators with bipolar architecture of the invention can thus be defined as being accumulators with bipolar architecture that comprise two end current collectors between which a stack of n electrochemical cells is disposed, n being an integer at least equal to 2, wherein:

each electrochemical cell comprises a positive electrode, a negative electrode and an ion-conducting membrane that is interposed between the positive electrode and the negative electrode and comprises a liquid electrolyte included in the electrodes (namely the positive electrode and the negative electrode) and the ion-conducting membrane;

the n electrochemical cells are separated from each other by n–1 bipolar current collectors;

and which are characterised in that the positive electrode and the negative electrode of each electrochemical cell are gelled electrodes comprising a composite material comprising a polymer matrix made from at least one gelling polymer (FF), an active electrode material and optionally one or more electron-conducting additives, the polymer matrix trapping the liquid electrolyte, the gelling polymer or polymers (FF) being chosen from fluorinated polymers comprising at least one repeating unit issuing from the polymerisation of a fluorinated monomer and, preferably, at least one repeating unit issuing from the polymerisation of a monomer comprising at least one carboxylic acid group, optionally in the form of a salt.

Before going into any more detail in the description, the following definitions are specified.

Positive electrode means, conventionally, hereinabove and hereinafter, the electrode that serves as a cathode when the accumulator is delivering current (that is to say when it is in the process of discharging) and which serves as an anode when the accumulator is in the process of charging.

Negative electrode means, conventionally, hereinabove and hereinafter, the electrode that serves as an anode when the accumulator is delivering current (that is to say when it is in the process of discharging) and which serves as a cathode when the accumulator is in the process of charging.

Repeating unit means, conventionally, hereinabove and hereinafter, a bivalent unit issuing from the polymerisation of a monomer and which repeats in the polymer.

In accordance with the invention, the accumulators of the inventor include, as an essential element, gelled electrodes (namely the positive and negative electrodes of each compartment) comprising (or even consisting of) a composite material comprising (or even consisting of) a polymer matrix made from at least one gelling polymer (FF), an active electrode material and optionally one or more electron-conducting additives, the polymer matrix trapping the liquid electrode, the gelling polymer or polymers (FF) being chosen from fluorinated polymers comprising at least one repeating unit issuing from the polymerisation of a fluorinated monomer and, preferably, at least one repeating unit issuing from the polymerisation of a monomer comprising at least one carboxylic acid group, optionally in the form of a salt.

By virtue of the fitting of these gelled electrodes trapping a liquid electrolyte, the following advantages are obtained:

the liquid electrolyte being confined in the gelled electrodes, there is no leakage of electrolyte between the compartments of the bipolar accumulator, which makes it possible to obtain a behaviour in stable cycling for all regimes, including in slow regime, and this for a large number of cycles;

because of the confinement of the liquid electrolyte in the gelled electrodes, it is not necessary to have specifically impervious seals at the periphery of the electrodes;

when the bipolar accumulator is manufactured, it is not necessary to perform a step of filling with electrolyte for each of the stacked cells nor before closure of the packaging, the liquid electrolyte already being contained in the gelled electrode or electrodes, which leads to a saving in time in the manufacturing method and to easy manipulation;

the possibility for these gelled electrodes also to prevent, because of the affinity thereof for the liquid electrolytes, the leakage of liquid electrolyte from the membranes, which are in contact with the gelled electrodes.

Advantageously, according to the invention, the ingredients constituting the positive electrode and the negative electrode are identical, apart from the nature of the active electrode material.

The gelling polymer or polymers (FF) are chosen from fluorinated polymers comprising at least one repeating unit issuing from the polymerisation of a fluorinated monomer and, preferably, at least one repeating unit issuing from the polymerisation of a monomer comprising at least one carboxylic acid group, optionally in the form of a salt.

It is understood that the repeating unit or units issuing from the polymerisation of a fluorinated monomer and, where applicable, the repeating unit or units issuing from the polymerisation of a monomer comprising at least one carboxylic acid group, optionally in the form of a salt, are chemically different repeating units and, in particular, the repeating unit or units issuing from the polymerisation of a fluorinated monomer do not comprise a carboxylic acid group, optionally in the form of a salt.

For the gelling polymers (FF), the repeating unit or units issuing from the polymerisation of a fluorinated monomer may, more specifically, be one or more repeating units issuing from the polymerisation of one or more ethylenic monomers comprising at least one fluorine atom and optionally one or more other halogen atoms, examples of monomers of this type being as follows:

$C_2$-$C_8$ perfluoroolefins, such as tetrafluoroethylene, or hexafluoropropene (also known by the abbreviation HFP);

$C_2$-$C_8$ hydrogenated fluoroolefins, such as vinylidene fluoride, vinylfluoride, 1,2-difluoroethylene and trifluoroethylene;

perfluoroalkylethylenes of formula $CH_2=CHR^1$, wherein $R^1$ is a $C_1$-$C_6$ perfluoroalkyl group;

$C_2$-$C_6$ fluoroolefins including one or more other halogen atoms (such as chlorine, bromine or iodine), such as chlorotrifluoroethylene;

(per)fluoroalkylvinylethers of formula $CF_2=CFOR^2$, wherein $R^2$ is a $C_1$-$C_6$ fluoro- or perfluoroalkyl group, such as $CF_3$, $C_2F_5$ or $C_3F_7$;

monomers of formula $CF_2=CFOR^3$, wherein $R^3$ is a $C_1$-$C_{12}$ alkyl group, a $C_1$-$C_{12}$ alkoxy group or a $C_1$-$C_{12}$ (per)fluoroalkoxy group, such as a perfluoro-2-propoxypropyl group; and/or monomers of formula $CF_2=CFOCF_2OR^4$, wherein $R^4$ is a $C_1$-$C_6$ fluoro- or perfluoroalkyl group, such as $CF_2$, $C_2F_5$ or $C_3F_7$, or a $C_1$-$C_6$ fluoro- or perfluoroalkoxy group, such as —$C_2F_5$—O—$CF_3$.

More particularly, the gelling polymer or polymers (FF) may comprise, as repeating unit or units issuing from the polymerisation of a fluorinated monomer, a repeating unit issuing from the polymerisation of a monomer in the category of $C_2$-$C_8$ perfluoroolefins, such as hexafluoropropene, and a repeating unit issuing from the polymerisation of a monomer in the category of $C_2$-$C_8$ hydrogenated fluoroolefins, such as vinylidene fluoride.

The repeating unit or units issuing from the polymerisation of a unit comprising at least one carboxylic acid group, optionally in the form of a salt, may, more specifically, be one or more repeating units issuing from the polymerisation of a monomer of the following formula (I):

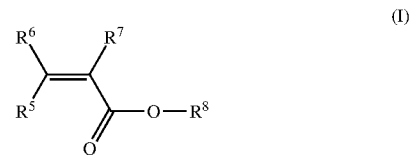

wherein $R^5$ to $R^7$ represent, independently of each other, a hydrogen atom or a $C_1$-$C_3$ alkyl group, and $R^8$ represents a hydrogen atom or a monovalent cation (for example an alkaline cation or an ammonium cation), particular examples of monomers of this type being acrylic acid or methacrylic acid.

Gelling polymers (FF) that can be particularly used in the context of the invention may be polymers comprising a repeating unit issuing from the polymerisation of a vinylidene fluoride, a repeating unit issuing from the polymerisation of a monomer comprising at least one carboxylic acid group, such as acrylic acid, and optionally a repeating unit issuing from the polymerisation of a fluorinated monomer different from vinylidene fluoride (and more specifically a repeating unit issuing from the polymerisation of hexafluoropropene).

More particularly again, gelling polymers (FF) that can be used in the context of the invention are gelling polymers the aforementioned repeating units of which issue from the polymerisation of:

at least 70% molar a $C_2$-$C_8$ hydrogenated fluoroolefin, preferably vinylidene fluoride;

0.1 to 15% molar a $C_2$-$C_8$ perfluoroolefin, preferably hexafluoropropene; and 0.01 to 20% molar a monomer of the aforementioned formula (I), preferably acrylic acid.

Moreover, the gelling polymer or polymers (FF) advantageously have an intrinsic viscosity, measured at 25° C. in N,N-dimethylformamide, ranging from 0.1 to 1.0 l/g, preferably from 0.25 to 0.45 l/g.

More specifically, the intrinsic viscosity is determined by the following equation based on the duration of fall, at 25° C., of a solution obtained by dissolution of the polymer concerned in a solvent (N,N-dimethylformamide) at a concentration of approximately 0.2 g/dl using an Ubbelohde viscometer:

$$[\eta] = \frac{\eta_{sp} + \Gamma \cdot \ln \eta_r}{(1+\Gamma) \cdot c}$$

wherein:

η corresponds to the intrinsic viscosity (in dl/g);

c corresponds to the concentration of polymer (in g/dl);

$\eta_r$ corresponds to the relative viscosity, that is to say the ratio between the duration of fall of the solution and the duration of fall of the solvent;

$\eta_{sp}$ corresponds to the specific viscosity, that is to say $\eta_r-1$;

Γ corresponds to an experimental factor fixed at 3 for the polymer concerned.

Each of the electrodes includes an active electrode material, namely a material able to insert and disinsert, in its structure, metal ions, such as alkaline ions (for example lithium when the accumulator is a lithium accumulator, sodium when the accumulator is a sodium accumulator, or potassium when the accumulator is a potassium accumulator), alkaline-earth ions (for example when the accumulator is a magnesium accumulator).

The nature of the active material of course depends on its purpose, namely whether it is intended for a positive electrode or a negative electrode.

By way of examples of active electrode materials able to form part of a positive electrode of a lithium accumulator, mention may be made of:

metal chalcogenides of formula $LiMQ_2$, wherein M is at least metal element chosen from metal transition elements, such as Co, Ni, Fe, Mn, Cr, V, and Q is a chalcogen, such as O or S, the preferred metal chalcogenides being those of formula $LiMO_2$, with M being as defined above, such as, preferably, $LiCoO_2$, $LiNiO_2$, $LiNi_xCo_{1-x}O_2$ (with $0<x<1$), or $LiMn_2O_4$ of spinel structure;

lithiated or partially lithiated materials of formula $M_1M_2(JO_4)_fE_{1-f}$, wherein $M_1$ is lithium, which may be partially substituted by another alkaline element to the extent of a degree of substitution of at least 20%, $M_2$ is a metal transition element with a degree of oxidation +2 chosen from Fe, Mn, Ni and the combinations thereof, which may be partially substituted by one or more other additional metal elements with degrees of oxidation between +1 and +5 to the extent of a degree of substitution of at least 35%, $JO_4$ is an oxyanion wherein J is chosen from P, S, V, Si, Nb, Mo and the combinations thereof, E is a fluoride, hydroxide or chloride anion, f is the molar fraction of the oxyanion $JO_4$ and is generally between 0.75 and 1 (including 0.75 and 1).

More specifically, the lithiated or partially lithiated materials may advantageously be based on phosphorus (which means, in other words, that the oxyanion complies with the formula $PO_4$) and may have a structure of the ordered or modified olivine type.

Preferably, the lithiated or partially lithiated materials may comply with the specific formula $Li_{3-x}M'_yM''_{2-y}(JO_4)_3$, wherein $0\leq x\leq 3$, $0\leq y\leq 2$, M' and M" represent identical or different metal elements, at least one of the M' and M" being a transition metal element, $JO_4$ is preferably $PO_4$, which may be partially substituted by another oxyanion with J being chosen from S, V, Si, Nb, Mo and the combinations thereof.

Even more preferably, the lithiated or partially lithiated materials may comply with the formula $Li(Fe_xMn_{1-x})PO_4$, wherein $0\leq x\leq 1$ and preferably x is equal to 1 (which means, in other words, that the corresponding material is $LiFePO_4$).

By way of examples of active electrode materials able to form part of a negative electrode of a lithium accumulator, mention may be made of:

carbon materials, such as graphitic carbon suitable for inserting lithium that may exist, typically, in the form of a powder, flakes, fibres or spheres (for example mesocarbon microbeads);

metallic lithium;

lithium alloys, such as those described in U.S. Pat. No. 6,203,944 and/or WO 00/03444;

lithiated titanium oxides, such as an oxide of formula $Li_{(4-x)}M_xTi_5O_{12}$ or $Li_4M_yTi_{(5-y)}O_{12}$ wherein x and y range from 0 to 0.2, M represents an element chosen from Na, K, Mg, Nb, Al, Ni, Co, Zr, Cr, Mn, Fe, Cu, Zn, Si and Mo, one specific example being $Li_4Ti_5O_{12}$, these oxides being lithium insertion materials having a low level of physical expansion after having inserted lithium;

non-lithiated titanium oxides, such as $TiO_2$;

oxides of formula $M_yTi_{(5-y)}O_{12}$ wherein y ranges from 0 to 0.2 and M is an element chosen from Na, K, Mg, Nb, Al, Ni, Co, Zr, Cr, Mn, Fe, Cu, Zn, Si and Mo;

lithium-silicon alloys, generally known by the term lithium silicides and advantageously having high Li/Si ratios, such as $Li_{4.4}Si$;

lithium-germanium alloys, such as those comprising crystalline phases of formula $Li_{4.4}Ge$.

Furthermore, whether for the positive electrode or the negative electrode, it may comprise electron-conducting additives, that is to say additives able to confer on the electrode in which they are incorporated an electron conductivity, these additives being able for example to be carbon materials such as carbon black, carbon nanotubes, carbon fibres (in particular carbon fibres obtained in the vapour phase known by the abbreviation VGCF), graphite in powder form, graphite fibres and mixtures thereof.

However, when a negative electrode includes, as an active material, carbon materials such as graphite, the negative electrode may advantageously be devoid of any electron-conducting additive or additives.

Advantageously, all the negative electrodes of the accumulator comply with the same specificities (namely in terms of composition and dimensions) just as all the positive electrodes of the accumulator also comply with the same specificities in terms of composition and dimensions.

Furthermore, whether for the positive electrode or the negative electrode, they comprise a liquid electrolyte trapped in the polymer matrix.

The liquid electrolyte trapped in the membrane is conventionally an ion-conducting electrolyte, which may comprise (or even consist of) at least one organic solvent, at least one metal salt and optionally a compound in the family of vinyl compounds.

The organic solvent or solvents may be carbonate solvents and more specifically:

cyclic carbon solvents, such as ethylene carbonate (represented by the abbreviation EC), propylene carbon (represented by the abbreviation PC), butylene carbonate, vinylene carbonate, fluoroethylene carbonate, fluoropropylene carbonate and mixtures thereof;

linear carbonate solvents, such as diethyl carbonate (represented by the abbreviation DEC), dimethyl carbonate (represented by the abbreviation DMC), ethyl methyl carbonate (represented by the abbreviation EMC) and mixtures thereof.

The organic solvent or solvents may also be ester solvents (such as ethyl propionate or n-propyl propionate), nitrile solvents (such as acetonitrile) or ether solvents (such as dimethylether or 1,2-dimethoxyethane).

The organic solvent or solvents may also be ionic liquids, that is to say, conventionally, compounds formed by the combination of a positively charged cation and a negatively charged anion, which is in the liquid state at temperatures below 100° C. at atmospheric pressure.

More specifically, the ionic liquids may comprise:
- a cation chosen from imidazolium, pyridinium, pyrrolidinium or piperidinium cations, said cations optionally being substituted by at least one alkyl group comprising 1 to 30 carbon atoms;
- an anion chosen from halide anions, perfluorinated anions or borates.

Even more specifically, the cation may be chosen from the following cations:

a pyrrolidinium cation of the following formula (II):

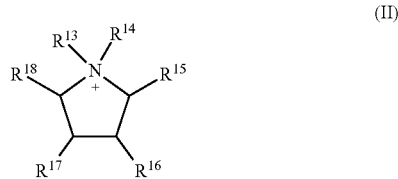

(II)

wherein $R^{13}$ and $R^{14}$ represent, independently of each other, a $C_1$-$C_8$ alkyl group and $R^{15}$, $R^{16}$, $R^{17}$ and $R^{18}$ represent, independently of each other, a hydrogen atom or a $C_1$-$C_{30}$ alkyl group, preferably a $C_1$-$C_{18}$ alkyl group, preferably again a $C_1$-$C_8$ alkyl group;

a piperidinium cation of the following formula (III):

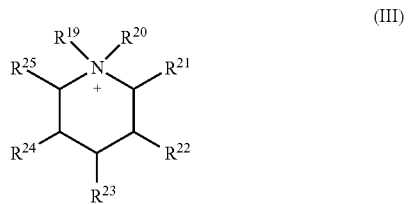

(III)

wherein $R^{19}$ and $R^{20}$ represent, independently of each other, a $C_1$-$C_8$ alkyl group and $R^{21}$, $R^{22}$, $R^{23}$, $R^{24}$ and $R^{25}$ represent, independently of each other, a hydrogen atom or a $C_1$-$C_{30}$ alkyl group, preferably a $C_1$-$C_{18}$ alkyl group, preferably again a $C_1$-$C_8$ alkyl group.

In particular, the positively charged cation may be chosen from the following cations:

a pyrrolidinium cation of the following formula (II-A):

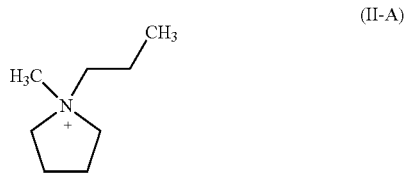

(II-A)

a piperidinium cation of the following formula (III-A):

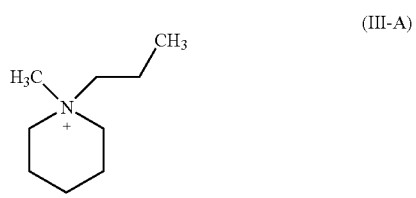

(III-A)

Specifically, the negatively charged ion may be chosen from:
- 4,5-dicyano-2-(trifluoromethyl)imidazole (known by the abbreviation TDI);
- bis(fluorosulfonyl)imide (known by the abbreviation FSI);
- bis(trifluoromethylsulfonyl)imide of formula $(SO_2CF_3)_2N^-$;
- hexafluorophosphate of formula $PF_6^-$;
- tetrafluoroborate of formula $BF_4^-$;
- oxaloborate of formula:

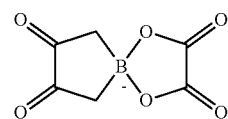

A specific ionic liquid that can be used according to the invention may be an ionic liquid composed of a cation of formula (II-A) as defined above and an anion of formula $(SO_2CF_3)_2N^-$, $PF_6^-$ or $BF_4^-$.

The metal salt or salts may be chosen from the salts with the following formulae: MeI, $Me(PF_6)_n$, $Me(BF_4)_n$, $Me(ClO_4)_n$, $Me(bis(oxalato)borate)_n$ (which may be designated by the abbreviation $Me(BOB)_n$), $MeCF_3SO_3$, $Me[N(FSO_2)_2]_n$, $Me[N(CF_3SO_2)_2]_n$, $Me[N(C_2F_5SO_2)_2]_n$, $Me[N(CF_3SO_2)(R_FSO_2)]_n$, wherein $R_F$ is a —$C_2F_5$, —$C_4F_9$ or —$CF_3OCF_2CF_3$ group, $Me(AsF_6)_n$, $Me[C(CF_3SO_2)_3]_n$, $Me_2S_n$, $Me(C_6F_3N_4)$ ($C_6F_3N_4$ corresponding to 4,5-dicyano-2-(trifluoromethyl)imidazole and, when Me is Li, the salt corresponds to lithium 4,5-dicyano-2-(trifluoromethyl)imidazole, this salt being known by the abbreviation LiTDI), wherein Me is a metal element and, preferably, a transition metal element, an alkaline element or an alkaline-earth element and, preferably again, Me is Li (in particular when the accumulator of the invention is a lithium-ion or lithium-air accumulator), Na (in particular when the accumulator is a sodium-ion accumulator), K (in particular when the accumulator is a potassium-ion accumulator), Cs, Mg (in particular when the accumulator is an Mg-ion accumulator), Ca (in particular when the accumulator is a calcium-ion accumulator) and Al (in particular when the accumulator is an aluminium-ion accumulator), and n corresponds to the degree of valency of the metal element (typically 1 or 2).

When Me is Li, the salt is preferably $LiPF_6$.

The concentration of the metal salt in the liquid electrolyte is advantageously at least 0.01 M, preferably at least 0.025 M and preferably again at least 0.05 M, and advantageously no more than 5 M, preferably no more than 2 M and preferably again no more than 1 M.

Furthermore, the liquid electrolyte may comprise an additive belonging to the category of vinyl compounds, such as vinylene carbonate, this additive being included in the electrolyte in a proportion not exceeding 5% by mass of the total mass of the electrolyte.

A liquid electrolyte that can be used in the accumulators of the invention, in particular when it is a case of a lithium-ion accumulator, is an electrolyte comprising a mixture of carbonate solvents (for example a mixture of cyclic carbonate solvents, such as a mixture of ethylene carbonate and propylene carbonate, and present for example in identical volumes), a lithium salt, for example $LiPF_6$ (for example, 1M) and vinylene carbonate (for example present to the extent of 2% by mass with respect to the total mass of the liquid electrolyte).

Furthermore, the positive electrode or electrodes and/or the negative electrode or electrodes may have a thickness ranging from 2 to 500 µm, preferably from 10 to 400 µm, and preferably again a thickness ranging from 50 to 300 µm.

By virtue of the gelled nature of the electrodes, it is possible to access greater thicknesses than conventional non-gelled electrodes, which makes it possible to incorporate more active material and thus to access greater contained energy.

Furthermore, each electrochemical cell includes a membrane disposed between the positive electrode and the negative electrode and therefore allows physical separation between these. It can thus be termed also a separator. This membrane, in a conventional manner, also allows ionic conduction (namely the passage of ions from the negative electrode to the positive electrode and vice versa, depending on whether a charging or discharging process is taking place), which makes it possible to term it an ion-conducting membrane. Furthermore, it advantageously makes it possible to confine a liquid electrolyte, said liquid electrolyte advantageously complying with the same specificities as the one forming part of the gelled electrodes.

More specifically, each membrane advantageously comprises an organic part comprising (or consisting of) at least one fluorinated polymer (F) comprising at least one repeating unit issuing from the polymerisation of a fluorinated monomer and at least one repeating unit issuing from the polymerisation of a monomer comprising at least one hydroxyl group, optionally in the form of a salt, and comprising an inorganic part formed in whole or in part by one or more oxides of at least one element M chosen from Si, Ti and Zr and the combinations thereof and furthermore comprises a liquid electrolyte, which is advantageously identical to the one included in the gelled electrodes.

The liquid electrolyte is advantageously confined or trapped in the material constituting the membrane and can comply with the same specific characteristics as those disclosed above with regard to the gelled electrodes, in term of ingredients (organic solvents, salts, concentrations, etc.).

For the fluorinated polymer (F), the repeating unit or units issuing from the polymerisation of a fluorinated monomer may more specifically be one or more repeating units issuing from the polymerisation of one or more ethylenic monomers comprising at least one fluorine atom and optionally one or more other halogen atoms, examples of monomers of this type being as follows:

$C_2$-$C_8$ perfluoroolefins, such as tetrafluoroethylene or hexafluoropropene (also known by the abbreviation HFP);

$C_2$-$C_8$ hydrogenated fluoroolefins, such as vinylidene fluoride, vinyl fluoride, 1,2-difluoroethylene and trifluoroethylene;

perfluoroalkylethylenes of formula $CH_2=CHR^1$, wherein $R^1$ is a $C_1$-$C_6$ perfluoroalkyl group;

$C_2$-$C_6$ fluoroolefins including one or more other halogen atoms (such as chlorine, bromine or iodine), such as chlorotrifluoroethylene;

(per)fluoroalkylvinylethers of formula $CF_2=CFOR^2$, wherein $R^2$ is a $C_1$-$C_6$ fluoro- or perfluoroalkyl group, such as $CF_3$, $C_2F_5$, $C_3F_7$;

monomers of formula $CF_2=CFOR^3$, wherein $R^3$ is a $C_1$-$C_{12}$ alkyl group, a $C_1$-$C_{12}$ alkoxy group or a $C_1$-$C_{12}$ (per)fluoroalkoxy group, such as a perfluoro-2-propoxypropyl group; and/or monomers of formula $CF_2=CFOCF_2OR^4$, wherein $R^4$ is a $C_1$-$C_6$ fluoro- or perfluoroalkyl group, such as $CF_2$, $C_2F_5$, $C_3F_7$, or a $C_1$-$C_6$ fluoro- or perfluoroalkoxy group such as —$C_2F_5$—O—$CF_3$.

More particularly, the fluorinated polymer (F) may comprise, as repeating units issuing from the polymerisation of a fluorinated monomer, a repeating unit issuing from the polymerisation of a monomer in the category of $C_2$-$C_8$ perfluoroolefins, such as hexafluoropropene, and a repeating unit issuing from the polymerisation of a monomer in the category of $C_2$-$C_8$ hydrogenated fluoroolefins, such as vinylidene fluoride.

Still with regard to the fluorinated polymer (F), the repeating unit or units issuing from the polymerisation of a monomer comprising at least one hydroxyl group, optionally in the form of a salt, may more specifically be one or more repeating units issuing from the polymerisation of a monomer of the following formula (IV):

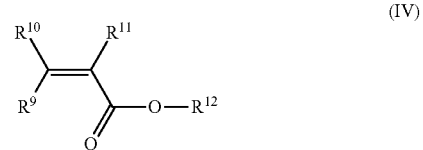

wherein $R^9$ to $R^{11}$ represent, independently of each other, a hydrogen atom or a $C_1$-$C_3$ alkyl group and $R^{12}$ is a $C_1$-$C_5$ hydrocarbon group comprising at least one hydroxyl group, examples of monomers of this type being hydroxyethyl (meth)acrylate monomers and hydroxypropyl (meth)acrylate monomers.

More particularly, the fluorinated polymer (F) may comprise, as a repeating unit issuing from the polymerisation of a monomer comprising at least one hydroxyl group, a repeating unit issuing from the polymerisation of one of the monomers with the following formulae (V) to (VII):

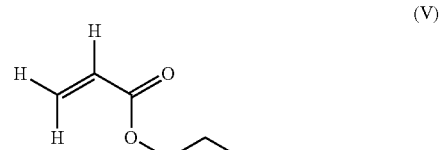

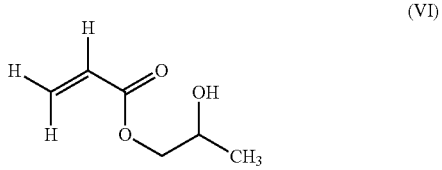

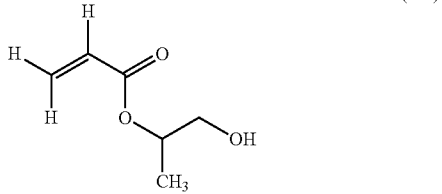

and preferably a repeating unit issuing from the polymerisation of the monomer of the aforementioned formula (V), this monomer corresponding to 2-hydroxyethyl acrylate (also known by the abbreviation HEA).

Thus, particular fluorinated polymers (F) that can be used in the context of the invention to form the membranes may be polymers comprising, as repeating units issuing from the polymerisation of a fluorinated monomer, a repeating unit issuing from the polymerisation of a monomer in the category of $C_2$-$C_8$ perfluoroolefins, such as hexafluoropropene, and a repeating unit issuing from the polymerisation of a monomer in the category of $C_2$-$C_8$ hydrogenated fluoroolefins, such as vinylidene fluoride, and comprising, as a repeating unit issuing from the polymerisation of a monomer comprising at least one hydroxyl group, a repeating unit issuing from the polymerisation of a monomer of formula (IV) previously defined, and more specifically again a polymer the aforementioned repeating units of which issue from the polymerisation of:

at least 70% molar a $C_2$-$C_8$ hydrogenated fluoroolefin, preferably vinylidene fluoride;
  0.1 to 15% molar a $C_2$-$C_8$ perfluoroolefin, preferably hexafluoropropene; and
  0.01 to 20% molar a monomer of formula (IV), preferably 2-hydroxyethyl acrylate.

Advantageously, the inorganic part at least partly formed by one or more oxides of at least one element M chosen from Si, Ti and Zr and the combinations thereof is, in whole or in part, chemically bonded to the organic part via the hydroxyl groups.

The membranes of the invention advantageously have a surface that entirely covers the surface of the negative electrodes, with which they are in contact (so as to ensure a clean separation from the positive electrode), with however the condition that they do not project beyond the face of the current collector accommodating the negative electrode, otherwise there would be a risk of creating an ionic short-circuit by putting in contact with the membrane of the adjacent cell during the process of assembling the various elements constituting the accumulators.

The accumulators of the invention are accumulators with bipolar architecture, which assumes the presence of a bipolar current collector between two adjacent cells.

More specifically, the bipolar current collector (when the accumulator includes only two cells) or the bipolar current collectors (when the accumulator includes more than two cells) can be defined as current collectors that separate two adjacent electrochemical cells from each other and which on a first face support an electrode of one of these electrochemical cells and on a second face opposite to the first face an electrode of the opposite sign to the other one of these electrochemical cells.

Moreover, it is considered that an electrochemical cell is adjacent to another electrochemical cell when it immediately precedes or follows it in the stack and is therefore separated from it only by a bipolar current collector.

The accumulators of the invention also comprise end current collectors generally positioned at the ends of the stack and which accommodate, on one of the faces thereof, an electrode layer belonging to an end cell (this electrode layer being a positive electrode layer or a negative electrode layer depending on the polarity required), this electrode layer conventionally having a constitution identical to that of an electrode layer with the same polarity associated with a bipolar current collector.

The current collector or collectors, whether moreover they be end or bipolar, may be single-layer, in which case they preferentially consist of a foil of aluminium, copper or an aluminium alloy, or double-layer, in which case they preferentially consist of a foil of aluminium associated with a layer of copper or two foils up against each other (for example an aluminium foil up against a copper foil). They have for example a thickness of 20 μm.

Advantageously, the current collector or collectors, whether they be end or bipolar, consist of a single-layer foil, such as an aluminium foil, in particular when the active material of the positive electrode is $LiNi_{0.33}Mn_{0.33}Co_{0.33}O_2$ and the active material of the negative electrode is $Li_4Ti_5O_{12}$.

They may advantageously be double layer, for example resulting from the juxtaposition of an aluminium foil and a copper foil, in particular when the active material of the positive electrode is $LiNi_{0.33}Mn_{0.33}Co_{0.33}O_2$ (the resulting positive electrode being placed on the face of the collector formed by the aluminium foil) and the active material of the negative electrode is graphite (the resulting negative electrode being placed on the face of the collector formed by the copper foil).

Whether for bipolar current collectors or end collectors, the face or faces occupied by an electrode advantageously have at the periphery thereof a free edge (that is to say not occupied by the electrode) and/or at least one tongue in contact with the collector or collectors or extending it or them, all or part of these free edges and/or tongues being covered, in whole or in part, by a layer of insulating material. More specifically, each pair of current collectors facing each other via a free edge and/or a tongue may comprise, for at least one of them, a layer of insulating material covering all or part of the free edge and/or of the tongue. This is because the presence of a layer of insulating material makes it possible to insulate these collectors with respect to electrons (and in particular to avoid a short-circuit, if they happened under the pressure of the stack to be in contact with each other). This insulating material affixed in the form of a layer fulfils the insulating function normally devolved to the seal or seals present at each cell in the conventional bipolar accumulators, these seals not being present for the accumulators of the invention, because the liquid electrolyte is sufficiently confined by the choice of the electrodes and membranes described above.

The layers of insulating material can adopt various positions.

Thus, according to a first embodiment illustrated in FIG. 2 showing in profile a bipolar accumulator comprising two cells (the references 15 and 17 illustrate respectively the negative electrodes and the positive electrodes of each cell, the reference 19 the membranes of each cell and the references 21, 23 and 25 illustrating respectively the negative end current collector, the bipolar current collector and the positive end current collector), provision is made for affixing a layer of insulating material (respectively referenced 27 and 29) on the tongues (respectively referenced 20 and 24) or each end current collector on the internal face thereof (that is to say the faces situated opposite each other).

According to a second embodiment illustrated in FIG. 3 showing in profile a bipolar accumulator comprising two cells (the references 15 and 17 illustrate respectively the negative electrodes and the positive electrodes of each cell, the reference 19 the membranes of each cell and the references 21, 23 and 25 illustrating respectively the negative end current collector, the bipolar current collector and the positive end current collector), provision is made for affixing:

a layer of insulating material (referenced 31) on the part of the free edge of the face of the bipolar current collector accommodating the positive electrode, this free-edge part being facing the tongue (referenced 33) of the negative end current collector; and a layer of insulating material (referenced 35) on the tongue (referenced 37) of the positive end current collector 25 opposite the face of the bipolar current collector.

Finally, according to a third embodiment illustrated in FIG. 4 showing in profile a bipolar accumulator comprising three cells (the references 15 and 17 illustrating respectively the negative electrodes and the positive electrodes of each cell, the reference 19 the membranes of each cell and the references 21, 23 and 25 illustrating respectively the negative end current collector, the bipolar current collectors and the positive end current collector), provision is made for affixing:

a layer of insulating material (referenced 31) on the free edges of the face of each bipolar current collector accommodating the positive electrode; and a layer of insulating material (referenced 35) on the tongue (referenced 37) of the positive end current collector 25 opposite the face of the bipolar current collector accommodating the negative electrode.

In these various embodiments given solely by way of illustration and non-limitatively, it is clear that the layers of insulating material are positioned so as to avoid any direct contact between the metal parts (free edge and/or tongues) of the faces of the current collectors situated opposite each other.

The insulating material used may consist of a plastics material, such as Kapton® or polypropylene and may be affixed to the required parts by adhesive bonding, coating, printing or simple putting in contact.

Furthermore, the accumulators of the invention may comprise a packaging intended, as its name indicates, to package the various elements constituting the stack.

This packaging may be flexible (in which case it is for example produced from a laminated film comprising a frame in the form of an aluminium sheet that is clad on the external surface thereof with a layer of polyethylene terephthalate (PET) or a polyamide and which is clad on the internal surface thereof with a layer of polypropylene (PP) or polyethylene (PE)), or rigid (in which case it is for example made from a lightweight and inexpensive metal such as stainless steel, aluminium or titanium, or a thermoset resin such as an epoxy resin) depending on the type of application sought.

The number n of electrochemical cells that can comprise the accumulators of the invention is chosen so as to obtain a total voltage Utot that is satisfactory according to the applications for which this accumulator is intended, in accordance with the rule Utot=n×Un, with Un corresponding to the voltage of the electrochemical pair employed. Typically, n may be between 2 and 20 with the accumulators of the invention.

The accumulators of the invention may find an application in the production of electric or hybrid vehicles, stationary energy storage devices and portable electronic devices (telephones, touch tablets, computers, photographic apparatus, camcorders, portable tools, sensors etc.).

Moreover, the accumulators of the invention may furthermore be adapted to various types of format, such as the planar format, for example of the button battery type; cylindrical formats; wound or spiral formats; the prismatic format.

The accumulators of the invention can be prepared by a method comprising a step of assembling the basic elements, which are the bipolar current collector or collectors clad on the two opposite faces respectively by a positive electrode and a negative electrode (the number of current collectors to be assembled corresponding to (n−1) with n corresponding to the number of cells in the accumulator), the membranes as defined above and the end current collectors clad on one of their faces in one case with a negative electrode and in the other case with a positive electrode.

Each membrane can be interposed between the positive electrode and the negative electrode of each cell, which means, in other words, that it pre-exists the formation of this stack, or it may be deposited (by all solution deposition techniques, such as coating, pouring or printing) on one face of one of the positive or negative electrodes of each cell.

The various basic elements may be prepared in advance before assembly, in particular with regard to the positive and negative electrodes.

Thus, in particular, the positive and negative electrodes may be produced by deposition of a composition comprising the ingredients constituting the electrodes (gelling polymer (FF), active material, liquid electrolyte and optionally at least one electron-conducting additive as defined above) on the current collectors by a solution deposition technique (for example coating, printing, pouring) followed by drying.

More specifically, the positive and negative electrodes may be prepared by a method comprising the following steps:

(i) the provision of a current collector;

(ii) the supply of a composition comprising at least one gelling polymer (FF) as defined above;

at least one active electrode material (it being understood that the active electrode material is an active positive electrode material when the method relates to the preparation of a positive electrode, or is an active negative electrode material when the method relates to the preparation of a negative electrode);

a liquid electrolyte;

optionally one or more electron-conducting additives;

(iii) the application of the composition of step (ii) on the current collector of step (i), by means of which there results an assembly comprising the current collector clad with at least one layer of said composition; and (iv) the drying of the assembly resulting from step (iii).

According to step (iii), the composition can be applied to a current collector by all types of application method, for example by pouring, printing or coating, for example with a roller.

Step (iii) can be repeated typically one or more times, according to the thickness of electrode required.

The ingredients of the composition may be in the same variations as those already defined for the same ingredients in the context of the description of the electrodes as such.

It should be noted that the composition advantageously comprises an organic solvent chosen so as to allow solubilisation of the gelling polymer or polymers (FF), this organic solvent being able to be that of the liquid electrolyte or being able to be added in addition to the other ingredients mentioned above.

In order to guarantee homogeneous properties for all the positive and negative electrodes of the accumulator, these may result from the same deposition layer (with a given composition for the positive electrode and a given composition for the negative electrode) deposited on a substrate composed of the material constituting the various current collectors, followed by a suitable cutting of this substrate in order to provide the various coated electrode current collectors.

Thus coated, the various current collectors can be provided with metal tongues in order to provide current pickup when it is a question of end current collectors or for controlling the voltage when it is a case of bipolar current collectors, or may be coated with a layer of insulating material on their free edge and/or on the tongues, as already described above.

The membranes, when they comply with the specific definition given above, are able to be obtained by a method comprising a hydrolysis-condensation step, in the presence of a liquid electrolyte and a fluorinated polymer (F) as defined above, of at least one organometallic compound comprising a metal element chosen from Si, Ti, Zr and the combinations thereof, a reaction occurring, advantageously between the organometallic compound and the fluorinated polymer (F).

More specifically, according to a particular embodiment, the membranes may be produced by a method comprising the following specific steps:

(i) a step of putting at least one fluorinated polymer (F) as defined above in contact with:

at least one organometallic compound M1 of the following formula:

$$X_{4-m}AY_m$$

wherein m is an integer ranging from 1 to 3, A is a metal element chosen from Si, Ti, Zr and the combinations thereof, Y is a hydrolysable group and X is a hydrocarbon group comprising at least one isocyanate group —N=C=O;

a liquid electrolyte as defined above;

optionally at least one organometallic compound $M_2$ of the following formula:

$$A'Y'_{m'}$$

wherein m' is an integer ranging from 1 to 4, A' is a metal element chosen from Si, Ti, Zr and the combinations thereof, and Y' is a hydrolysable group;

(ii) a step of reacting at least part of the hydroxyl groups of the fluorinated polymer (F) with at least part of the compound M1 and, optionally, at least part of the compound $M_2$, by means of which a composition is obtained comprising a fluorinated polymer wherein at least part of the hydroxyl groups is transformed into groups of formula —O—CO—NH—Z-AY$_m$X$_{3-m}$, wherein m, Y, A and X are as defined above and Z is a hydrocarbon group comprising optionally at least one group —N=C=O, and optionally at least part of the hydroxyl groups is transformed into groups of formula —O-A'Y'$_{m'-1}$ wherein A', Y' and m' being as defined above;

(iii) a step of hydrolysis-condensation of the composition obtained at (ii) by means of which an inorganic part of the membranes used in the context of the invention is formed.

This type of method falls within the category of methods of the sol-gel type, since it involves organometallic compounds including hydrolysable groups and a step of hydrolysis-condensation of these compounds in order to form an inorganic part.

The hydrolysable group for the compound M1 is preferably chosen so as to allow the formation of a —O-A-bond, this group being able to be chosen from halogen atoms (preferably chlorine), alkoxy groups, acyloxy groups and hydroxyl groups.

More specifically, the compound M1 may comply with the following formula:

$$O=C=N—R^A-A-(OR^B)_3$$

wherein A is a metal element chosen from Si, Ti, Zr and the combinations thereof, $R^A$ is a hydrocarbon group, linear or branched, comprising from 1 to 12 carbon atoms, and the $R^B$, identical or different, are hydrocarbon groups, more specifically alkyl groups, linear or branched and comprising from 1 to 5 carbon atoms (for example methyl or ethyl groups).

By way of examples of compound M1, mention can be made of trimethoxysilylmethylisocyanate, triethoxysilylmethylisocyanate, trimethoxysilylethylisocyanate, triethoxysilylethylisocyanate, trimethoxysilylpropylisocyanate, triethoxysilylpropylisocyanate, trimethoxysilylbutylisocyanate, triethoxysilylbutylisocyanate, trimethoxysilylpentylisocyanate, triethoxysilylpentylisocyanate, trimethoxysilylhexylisocyanate, triethoxysilylhexylisocyanate.

For the compound M2, in the same way as for the compound M1, the hydrolysable group for the compound M2 is chosen, preferably, so as to allow the formation of a —O-A-bond, this group being able to be chosen from halogen atoms (preferably chlorine), alkoxy groups, acyloxy groups and hydroxyl groups.

By way of examples of compounds M2, when A is silicon, mention can be made of tetramethoxysilane (known by the abbreviation TMS) or tetraethoxysilane (known by the abbreviation TEOS).

The reaction step (ii) is generally performed at a temperature ranging from 20° to 100° C., preferably from 20° to 90° C. and preferably again from 20° to 60° C. and, preferably, under an inert gas atmosphere (such as an argon flow).

This reaction step (ii) and the subsequent step (iii) can be performed in the presence of a condensation catalyst, which can be introduced during a step (i).

The condensation catalyst may be an organotin compound.

It may be introduced, in the step (i), to the extent of 0.1% to 50% molar, preferably 1 to 25% molar, preferably again 5 to 15% molar with respect to the total number of moles of the compound M1 and, where applicable, of the compound M2.

By way of examples of organotin compounds, mention can be made of dibutyltin dilaurate, dibutyltin oxide, tributyltin oxide, dioctyltin oxide, tributyltin chloride and tributyltin fluoride.

The hydrolysis-condensation step (iii) may be performed at ambient temperature or by heating to a temperature below 100° C., the choice of the temperature being dependent on the boiling point of the liquid electrolyte.

This hydrolysis-condensation step may be performed in the presence of an acid catalyst, which may be added during one of steps (i) to (iii), for example to the extent of 0.5 to 10% by mass, preferably 1 to 5% by mass on the total basis of the composition.

This acid catalyst may in particular be an organic acid, such as formic acid.

Furthermore, the method may comprise a step (iv) of forming the composition in the form of a membrane, this formation step being able to take place concomitantly with the hydrolysis-condensation step (iii), this formation step being able to be performed by any known techniques of membrane formation involving a composite material, for example a suitable technique being the technique of deposition by extrusion slot, or commonly known by the English term "slot-die coating".

Finally, the method for preparing accumulators of the invention may comprise a step of fitting a packaging around the accumulator, this fitting being able to be performed by heat sealing in the case of a flexible packaging and by laser welding in the case of a rigid packaging.

BRIEF DESCRIPTION OF THE DRAWINGS

Other advantages and features of the invention will emerge from the remainder of the following detailed description, which is given by way of illustration of the invention and which refers to the accompanying figures, wherein.

DETAILED DISCLOSURE OF PARTICULAR EMBODIMENTS

Example 1

Figure 1:
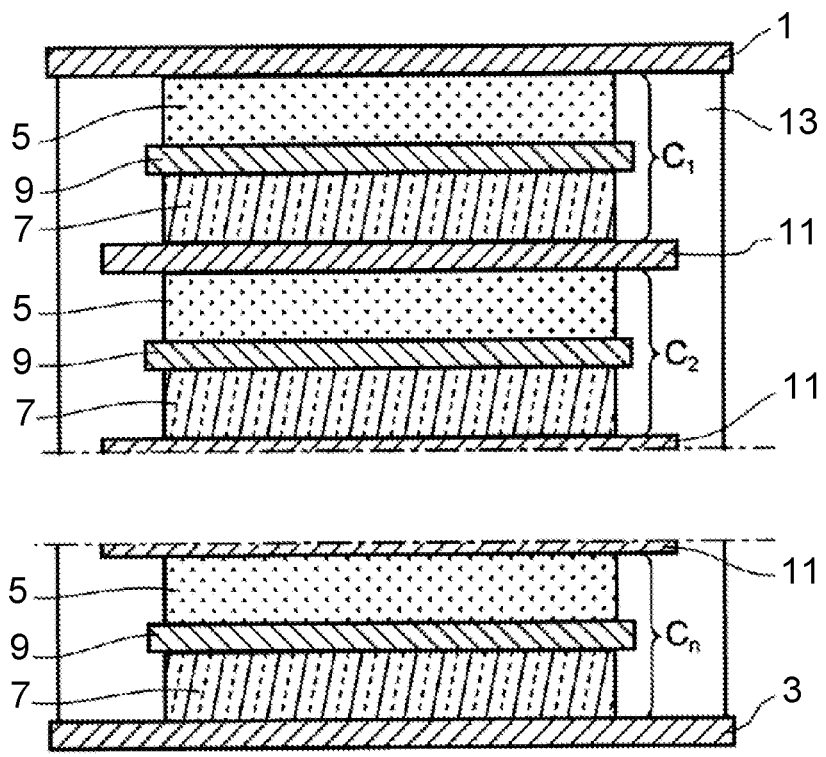
FIG. 1, already commented on, shows schematically a view in longitudinal section of a conventional example of an accumulator with bipolar architecture.
Figure 2:
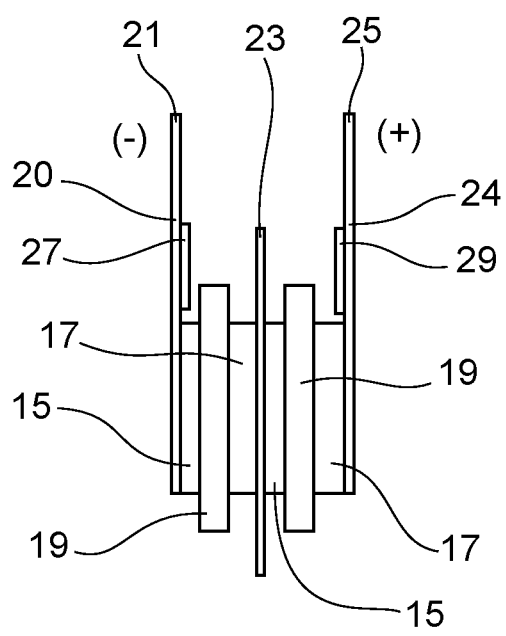
FIGS. 2 to 4, already commented on, show schematically views in longitudinal section of accumulators according to the invention.
Figure 3:
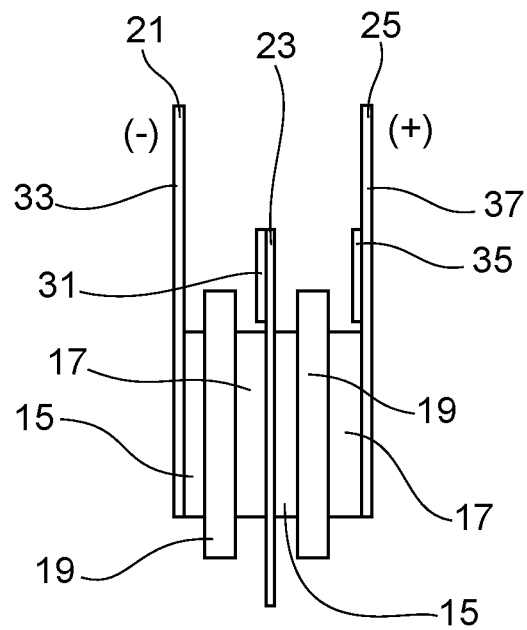
Figure 4:
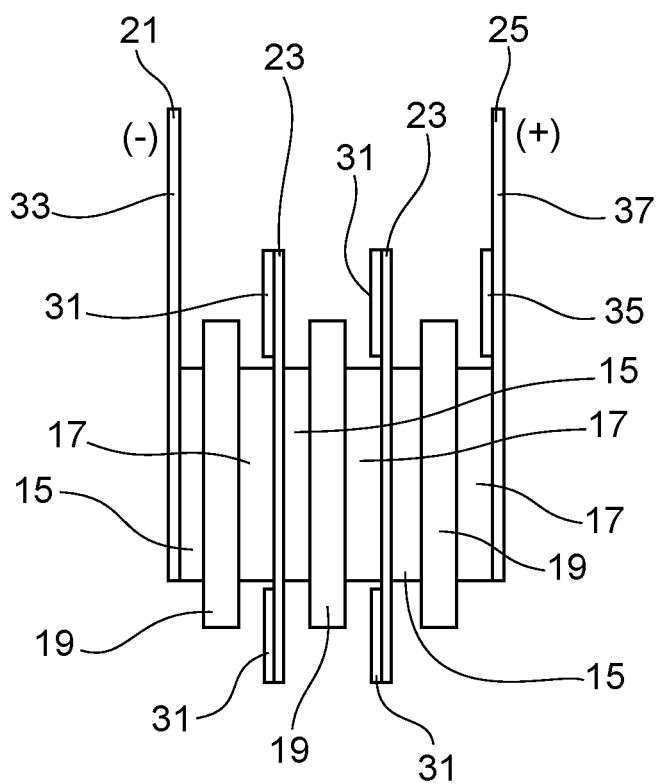

In this example the preparation of a lithium accumulator with a bipolar structure according to the invention is disclosed, involving the following steps:
1) The preparation of the electrodes
2) The preparation of the membrane
3) The preparation of the accumulator.

1—Preparation of the Electrodes

For preparing the inks intended for preparing the electrodes, the same gelling polymer is used, whether for the positive electrode or the negative electrode. This is a polymer comprising repeating units issuing from the polymerisation of vinylidene fluoride (96.7% molar), acrylic acid (0.9% molar) and hexafluoropropene (2.4% molar) and having an intrinsic viscosity of 0.30 L/g in dimethylformamide at 25° C. This polymer is designated below by the terminology "polymer 1". This is incorporated in the ink intended for manufacturing the electrodes in the form of a solution of acetone wherein 10% polymer 1 is dissolved at 60° C. This solution is cooled to ambient temperature and introduced into a glove box under an argon atmosphere ($O_2$<2 ppm, $H_2O$<2 ppm).

a) Preparation of the Ink for the Negative Electrodes

To do this, a mixture of 50% by mass carbon black C-NERGY® $C_{65}$ and 50% by mass carbon fibres "VGCF fibres" and $Li_4Ti_5O_{12}$ (referred to as LTO) was added to the solution of polymer 1 mentioned in the previous paragraph, so that the ratio by mass of ((VGCF+C65+LTO)/polymer 1) is 95/5 with a ratio by mass of (VGCF+C65)/LTO equal to 5.3/94.7. To the resulting mixture, there was added also a liquid electrolyte composed of a mixture (EC:PC) in a proportion by mass (1:1) (EC designating ethylene carbonate and PC designating propylene carbonate), vinylene carbonate (to the extent of 2% by mass) and a lithium salt $LiPF_6$ (1 M). The liquid electrolyte was added so as to obtain a ratio by mass $(m_{electrolyte}/(m_{electrolyte}+m_{polymer\ 1}))\times 100$ equal to 75%.

The whole placed in a hermetically closed flask in order to avoid the evaporation of the acetone was mixed for 1 hour using a magnetic stirrer.

b) Preparation of the Ink for the Positive Electrodes

To do this, a mixture of 50% by mass carbon black C-NERGY® C65 and 50% by mass carbon fibres obtained in vapour phase known as "VGCF fibres" and $LiNi_{0.33}Mn_{0.33}Co_{0.33}O_2$ (referred to as NMC) was added to the solution of polymer 1 mentioned in the above paragraph, so that the ratio by mass of ((VGCF+C65+NMC)/polymer 1) is 92.8/7.2 with a ratio by mass of (VGCF+C65)/NMC equal to 7.7/92.3. To the resulting mixture, there was added also a liquid electrolyte composed of a mixture (EC:PC) in a proportion by mass (1:1) (EC designating ethylene carbonate and PC designating propylene carbonate), vinylene carbonate (to the extent of 2% by mass) and a lithium salt $LiPF_6$ (1 M). The liquid electrolyte was added so as to obtain a ratio by mass $(m_{electrolyte}/(m_{electrolyte}+m_{polymer\ 1}))\times 100$ equal to 85.7%.

The whole placed in a hermetically closed flask in order to avoid the evaporation of the acetone was mixed for 1 hour using a magnetic stirrer.

c) Preparation of the Electrodes

The bipolar current collector coated with the electrodes and the two positive and negative end electrodes were prepared from the same strip (referred to below as the bipolar electrode strip), so that the bipolar cell is constructed from positive and negative electrodes having strictly the same characteristics.

Preparation of the Bipolar Electrode Strip

The preparation of a bipolar electrode strip by coating was carried out in an anhydrous room (with a dewpoint of −40° to 20° C.) by means of a laboratory coating table.

To do this, an LTO negative electrode strip was produced by coating the ink prepared above on an aluminium foil (having a thickness of 20 μm) over a width of 100 mm, applying a coating thickness of 320 μm. It was dried in free air in an anhydrous room for 30 minutes. Its surface capacitance was measured at 1.5 mAh/cm².

Another NMC positive electrode strip was produced by coating the ink prepared above on the other face of the same aluminium foil, at the rear of the LTO coat, preferably, at the centre, over the same width of 75 mm, applying a coating thickness of 360 μm. It was dried in free air in an anhydrous room for 30 minutes. Its surface capacitance was measured at 1.65 mAh·cm².

Preparation of the Basic Components for the Preparation of the Bipolar Current Collector Coated with the Electrodes and the Positive and Negative End Electrodes Three rectangles of 40 mm×60 mm were cut out by means of a hollow punch in the double-pole electrode strip coated over 100 mm. Each of these rectangles was then cleaned at the periphery on each face in order in the end to leave two facing positive and negative electrode squares measuring 32 mm×32 mm. The square electrodes are thus surrounded on three sides by bare aluminium strips 4 mm wide and on the fourth side by a strip 24 mm wide.

The three rectangles thus prepared constitute the basic components that were used to produce the bipolar current collector coated with the electrodes and the two negative and positive end electrodes of the bipolar accumulator. Each rectangle was compressed between two metal plates measuring 100 mm×100 mm under a weight of 2 tonnes, in order to provide the same densification level for all the electrodes.

Preparation of the Positive End Electrode

The positive end electrode is produced from one of the three basic components mentioned above. Thus, using a specific hollow punch, the square shaped end electrode of dimensions 32 mm×32 mm is cut out leaving a bare aluminium tongue of dimensions 5 mm×20 mm for picking up the current. On the other face of the square, the negative electrode layer is entirely removed, revealing the metal current collector.

An aluminium tongue equipped with a sealing ribbon positioned at the heat-sealing zone of the packaging is welded by ultrasound on the current pickup.

Preparation of the Negative End Electrode

The negative end electrode is produced by a procedure similar to the procedure for the positive electrode:
- cutting out a negative electrode square of 32 mm×32 mm using a hollow punch, leaving an aluminium tongue for the current pickup;
- complete cleaning of the positive face in order to leave only the bare current collector;
- ultrasound welding of an aluminium tongue on the current pickup, which will serve as a negative pole for the battery with positioning of a sealing ribbon at the heat-sealing zone of the packaging.

Preparation of the Bipolar Current Collector Coated with the Electrodes

The bipolar current collector coated with the electrodes is produced from the third basic component, cutting out the bare aluminium strip 24 mm wide over a length of 25 mm, thus leaving a tongue 15 mm wide. To this there is then welded by ultrasound a thinner (5 mm) and longer tongue, which will be used for controlling the voltage of the electrode. As for the end electrodes, a sealing ribbon will be placed at the heat-sealing zone of the packaging.

On the side opposite to the square electrode, a small strip of an adhesive of the Kapton® type is bonded onto each face of the 4 mm bare aluminium strip, in order to avoid any electrical short-circuit between the positive, negative and bipolar electrodes, once assembled.

No seal is placed around the electrodes coating the bipolar current collector, nor around the end electrodes.

2—Preparation of the Membrane

The polymer hybrid membrane consists of an organic/inorganic hybrid copolymer based on modified PVdF-HFP including methacrylic branches (PVdF-HEA-HFP) in which a sol-gel reaction is carried out using tetraethoxysilane (TEOS).

It is obtained by coating a polymer solution on a polyethylene terephthalate (PET) substrate.

a) Preparation of the Polymeric Solution

To do this, 10 g of a copolymer comprising repeating units issuing from the polymerisation of vinylidene fluoride (VDF), 2-hydroxyethyl acrylate (HEA) and hexafluoropropene (HFP), this polymer being called PVdF-HEA-HFP (VDF 96.8% molar, HEA 0.8% molar and HFP 2.4% molar) and having an intrinsic viscosity of 0.08 g/l, is introduced into a double-wall synthesis reactor of 300 ml previously inerted with argon, and then 67 ml of anhydrous acetone at 99.9% purity is added. The mixture is stirred mechanically for 30 minutes at 60° C. under argon flow. Next 0.10 g of dibutyltin dilaurate (DBTL) is added and the resulting mixture is stirred for 30 minutes at 60° C. under argon flow. 0.40 g of 3-(triethoxysilyl)propyl isocyanate (TSPI) is next added and the mixture is stirred for 90 minutes at 60° C. under argon flow. 37.50 g of electrolyte with a composition identical to that used for the electrodes is added and the mixture is stirred for 30 minutes at 60° C. under argon flow. 2.50 g of formic acid is next added and the mixture is stirred for 30 minutes at 60° C. under argon flow. Finally, 3.47 g of tetraethoxysilane is added and the mixture is stirred for 30 minutes at 60° C. under argon flow.

b) Preparation of the Membranes Using the Polymer Solution

Once prepared, the polymer solution is transferred into a sealed flask in an anhydrous room (dew point −20° C. to 22° C.). It is then coated by means of an R2R coating machine R2R ("Roll to roll slot die coating machine, Ingecal tailor made"), the solution being introduced into the machine at ambient temperature but in a controlled environment with a dew point of −20° C. to 22° C. The parameters of use of the machine are as follows:
- Line speed: 1 m/min;
- Drying section: 40° C. for the first and second zones; 50° C. for the third zone and 60° C. for the fourth zone;
- Opening of the slot under extrusion: 300 μm, which makes it possible to obtain a membrane of approximately 50 μm deposited on a polyethylene terephthalate (PET) substrate.

The membrane strip thus obtained is then stored in a heat-sealed airtight pouch while awaiting proceeding with the assembly of the double-pole accumulator.

3—Preparation of the Bipolar Accumulator

Two membranes of dimensions 34 mm×34 mm are cut and deposited on the two faces of the bipolar current collector coated with the electrodes. The end electrodes are then placed against the membranes, facing each electrode of opposite polarity of the bipolar current collector. The bipolar electrochemical core with two compartments is then fixed in a flexible packaging formed by a multilayer aluminium foil. The whole is then heat sealed, the heat-sealing zone necessarily passing at the level of the sealing ribbons of the two end electrodes and of the bipolar current collector coated with the electrodes, in order to ensure the sealing of the packaging vis-à-vis moisture.

Having regard to the characteristics of the electrodes, the expected capacity of the battery is 15.3 mAh. The latter was cycled at ambient temperature 20° C. with a current of approximately 100 μA over the potential range [2-6 V] and with cutoff voltages per compartment fixed at between 1 V and 3 V.

Figure 5:
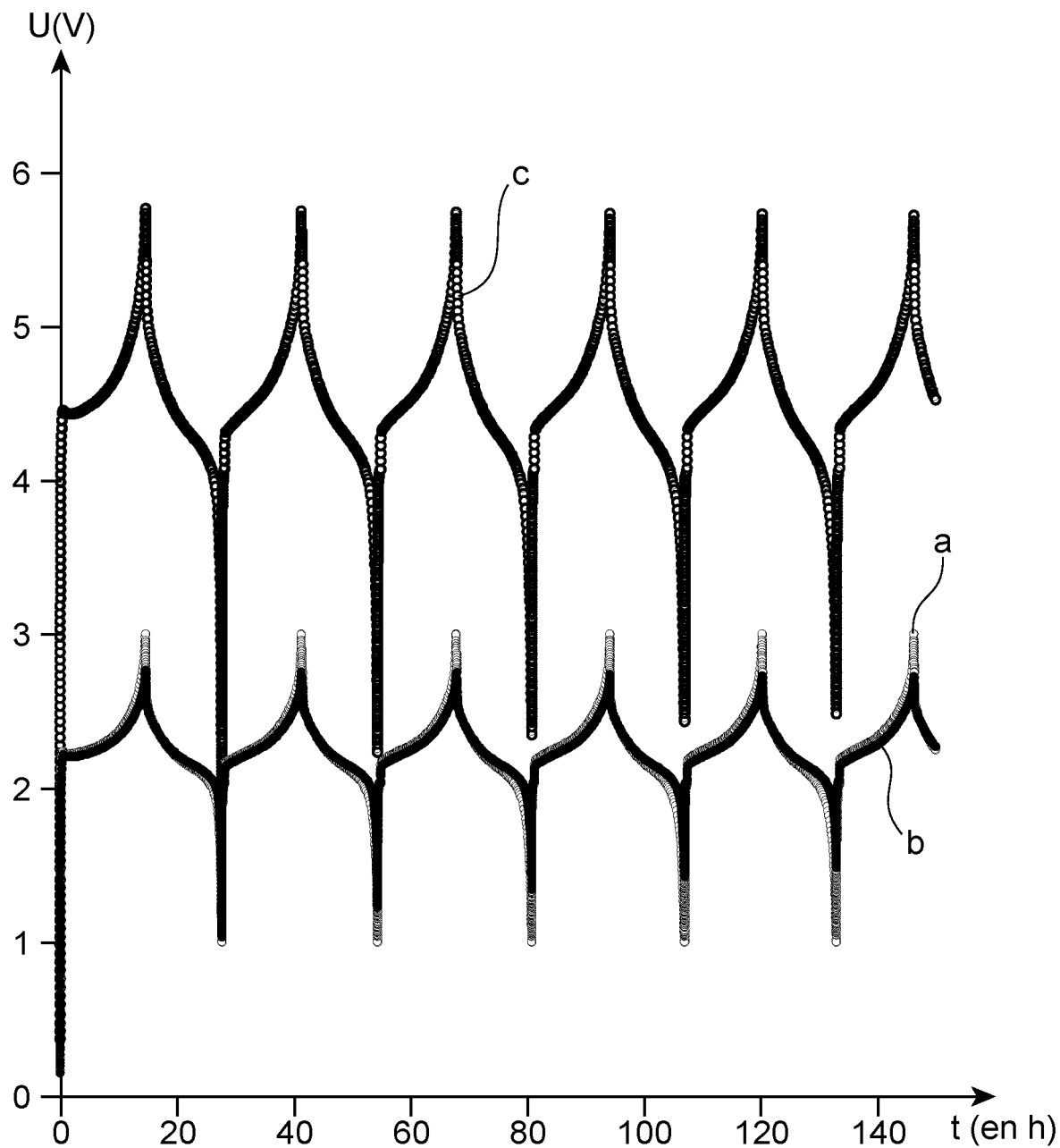
FIG. 5 is a graph, obtained in the context of the tests of example 1 and illustrating the change in the voltage U (in V) as a function of time t (in h) with the curves a) and b) for the first cell and the second cell of the accumulator and the curve c) for the accumulator as such.

The test shows that the two compartments function exactly in the same way with a superimposition of the voltage curves at all the cycles for the first cell and second cell, as illustrated by FIG. 5 (illustrating the change in the voltage U (in V) as a function of time t (in h) with the curves a) and b) for the first cell and the second cell of the accumulator and the curve c) for the accumulator as such.

Figure 6:
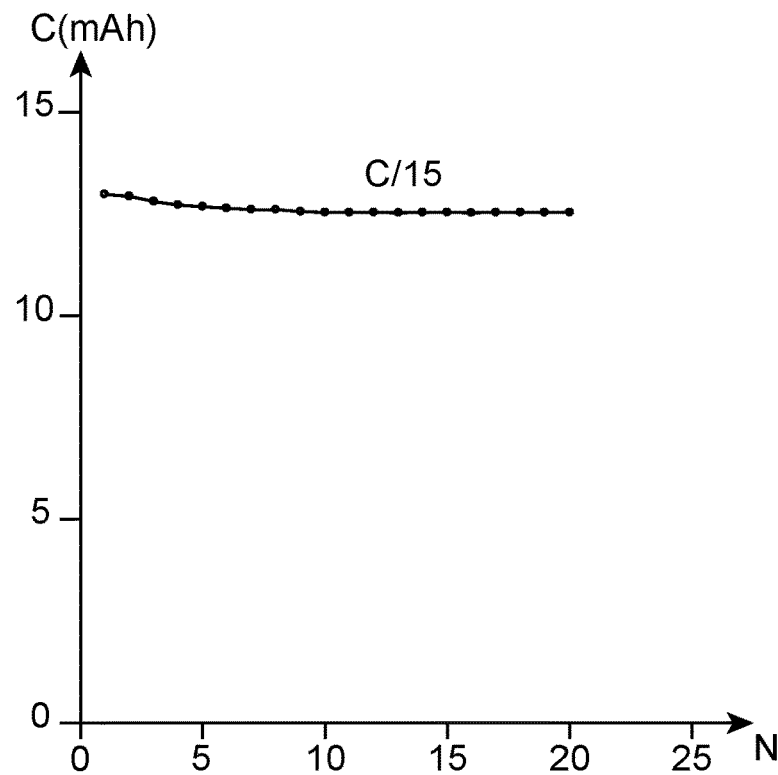
FIG. 6 is a graph obtained in the context of the tests of example 1 and illustrating the change in the discharge capacitance C (in mAh) as a function of the number of cycles N of an accumulator according to the invention.

A stable behaviour has also been demonstrated for the accumulator with a discharge capacity remaining stable over at least 20 cycles, as illustrated in FIG. 6, which illustrates the change in the discharge capacity C (in mAh) as a function of the number of cycles N.

Figure 7:
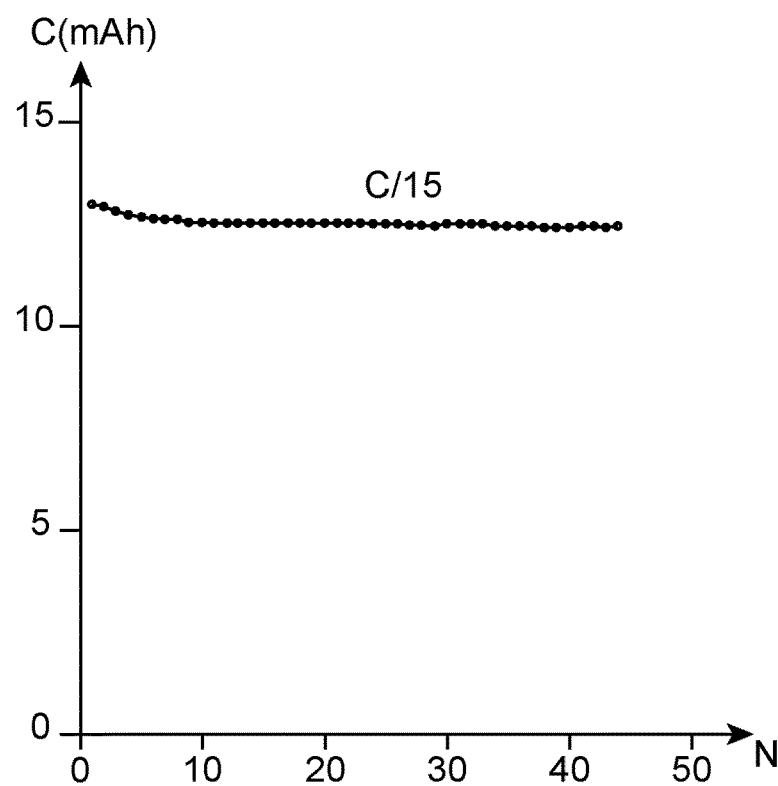
FIG. 7 is another graph obtained in the context of the tests of example 1 and illustrating the change in the discharge capacitance C (in mAh) as a function of the number of cycles N of an accumulator according to the invention.

Likewise, a stable behaviour has been demonstrated for the accumulator with a discharge capacity remaining stable over at least 40 cycles, as illustrated in FIG. 7, which illustrates the change in the discharge capacity C (in mAh) as a function of the number of cycles N.

The operating principle having been demonstrated, a bipolar accumulator similar to the one defined above was produced, except that the active material of the negative electrode was replaced by graphite and the bipolar current collector was replaced by a bipolar current collector resulting from putting together a copper foil and aluminium foil, the face occupied by the copper foil accommodating the negative electrode and the face occupied by the aluminium foil accommodating the positive electrode. The performance of this accumulator is very good, in particular in terms of a performance that is stable over cyclings with similar behaviour of the compartments (which attests to the absence of ionic leakage).

Finally, an accumulator was produced similar to the one defined above, except that it includes not two cells based on an NMC positive electrode and an LTO negative electrode but three cells. The performance of this accumulator is also very good, in particular in terms of performance that is stable over cyclings with similar behaviour of the compartments (which attests to the absence of ionic leakage).

What is claimed is:

1. An accumulator with bipolar architecture that comprises two end current collectors between which a stack of n electrochemical cells is disposed, n being an integer at least equal to 2, wherein:
   each electrochemical cell comprises a positive electrode, a negative electrode, and an ion-conducting membrane that is interposed between the positive electrode and the negative electrode and comprises a liquid electrolyte included in the positive electrode, the negative electrode, and the ion-conducting membrane;
   the n electrochemical cells are separated from each other by n−1 bipolar current collector(s);
   and wherein the positive electrode and the negative electrode of each electrochemical cell are gelled electrodes each comprising a composite material comprising a polymer matrix made from at least one gelling polymer (FF), an active electrode material and optionally one or more electron-conducting additives, the polymer matrix trapping the liquid electrolyte, the at least one gelling polymer (FF) being chosen from fluorinated polymers comprising at least one repeating unit issuing from polymerization of a fluorinated monomer and at least one repeating unit issuing from polymerization of a monomer comprising at least one carboxylic acid group, optionally in the form of a salt,
   wherein the bipolar current collector(s) and at least one of the end current collectors have at least one face, which accommodates the positive electrode or the negative electrode and which comprises, at a periphery thereof:
   at least one free edge of the bipolar current collector(s) not occupied by the positive electrode or negative electrode, and
   at least one tongue of the at least one end current collector, which is in contact with the at least one end current collector or extending the same,
   the at least one free edge and/or the at least one tongue being metal parts each covered by a layer of insulating material positioned to avoid a direct contact between the metal parts of the bipolar current collector(s) and of the end current collector(s) situated opposite each other, the layer of insulating material not forming an impervious seal to the liquid electrolyte, and
   wherein each electrochemical cell is devoid of a physical barrier to the flow of the liquid electrolyte.

2. The accumulator according to claim 1, wherein the at least one repeating unit issuing from the polymerization of a fluorinated monomer issues from the polymerization of at least one ethylenic monomer comprising at least one fluorine atom, from the at least one ethylenic monomer being chosen from:
   $C_2$-$C_8$ perfluoroolefins;
   $C_2$-$C_8$ hydrogenated fluoroolefins;
   perfluoroalkylethylenes of formula $CH_2=CHR^1$, wherein $R^1$ is a $C_1$-$C_6$ perfluoroalkyl group;
   $C_2$-$C_6$ fluoroolefins including one or more other halogen atoms;
   (per) fluoroalkylvinylethers of formula $CF_2=CFOR^2$, wherein $R^2$ is a $C_1$-$C_6$ fluoro- or perfluoroalkyl group;
   monomers of formula $CF_2=CFOR^3$, wherein $R^3$ is a $C_1$-$C_{12}$ alkyl group, a $C_1$-$C_{12}$ alkoxy group or a $C_1$-$C_{12}$ (per) fluoroalkoxy group; and/or
   monomers of formula $CF_2=CFOCF_2OR^4$, wherein $R^4$ is a $C_1$-$C_6$ fluoro- or perfluoroalkyl group, or a $C_1$-$C_6$ fluoro- or perfluoroalkoxy group.

3. The accumulator according to claim 1, wherein the at least one gelling polymer (FF) comprises, as repeating units issuing from the polymerisation of a fluorinated monomer, a repeating unit issuing from the polymerization of a monomer in the category of $C_2$-$C_8$ perfluoroolefins, and a repeating unit issuing from the polymerization of a monomer in the category of $C_2$-$C_8$ hydrogenated fluoroolefins.

4. The accumulator according to claim 1, wherein the at least one repeating unit issuing from the polymerization of a monomer comprising at least one carboxylic acid group, optionally in the form of a salt, issues from the polymerization of a monomer of the following formula (I):

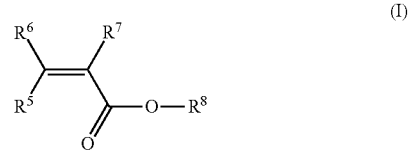

wherein $R^5$ to $R^7$ represent, independently of each other, a hydrogen atom or a $C_1$-$C_3$ alkyl group, and $R^8$ represents a hydrogen atom or a monovalent cation.

5. The accumulator according to claim 1, wherein the at least one gelling polymer (FF) is a polymer comprising a repeating unit issuing from polymerization of vinylidene fluoride, a repeating unit issuing from polymerization of said monomer comprising at least one carboxylic acid group, and optionally a repeating unit issuing from the polymerization of a fluorinated monomer different from vinylidene fluoride.

6. The accumulator according to claim 1, wherein the liquid electrolyte is trapped in the ion-conducting membrane and is an ion-conducting electrolyte comprising at least one organic solvent, at least one metal salt and optionally a compound in the family of vinyl compounds.

7. The accumulator according to claim 6, wherein the at least one organic solvent is a carbonate solvent.

8. The accumulator according to claim 6, wherein the at least one metal salt is chosen from the salts with the following formulae: MeI, Me $(PF_6)_n$, Me$(BF_4)_n$, Me$(ClO_4)_n$, Me(bis(oxalato)borate)$_n$, MeCF$_3$SO$_3$, Me[N(FSO$_2$)$_2$]$_n$, Me[N(CF$_3$SO$_2$)$_2$]$_n$, Me[N(C$_2$F$_5$SO$_2$)$_2$]$_n$, Me[N(CF$_3$SO$_2$)(RFSO$_2$)]$_n$, wherein R$_F$ is a —C$_2$F$_5$, —C$_4$F$_9$ or —CF$_3$OCF$_2$CF$_3$, Me(AsF$_6$)$_n$, Me[C(CF$_3$SO$_2$)$_3$]$_n$, Me$_2$Sn, Me(C$_6$F$_3$N$_4$) group, wherein Me is a metal element and n corresponds to the degree of valency of the metal element.

9. The accumulator according to claim 1, wherein the ion-conducting membrane comprised in each electrochemical cell comprises an organic part comprising at least one fluorinated polymer (F) comprising at least one membrane repeating unit issuing from the polymerization of a fluorinated monomer and at least one membrane repeating unit issuing from the polymerization of a monomer comprising at least one hydroxyl group, optionally in the form of a salt, and comprises an inorganic part formed, at least partly, by one or more oxides of at least one element M chosen from Si, Ti and Zr and the combinations thereof.

10. The accumulator according to claim 9, wherein the at least one membrane repeating unit issuing from the polymerization of a fluorinated monomer issues from the polymerization of one or more ethylenic monomers comprising at least one fluorine atom chosen from:
- $C_2$-$C_8$ perfluoroolefins;
- $C_2$-$C_8$ hydrogenated fluoroolefins;
- perfluoroalkylethylenes of formula $CH_2=CHR^1$, wherein $R^1$ is a $C_1$-$C_6$ perfluoroalkyl group;
- $C_2$-$C_6$ fluoroolefins including one or more other halogen atoms;
- (per) fluoroalkylvinylethers of formula $CF_2=CFOR^2$, wherein $R^2$ is a $C_1$-$C_6$ fluoro- or perfluoroalkyl group;
- monomers of formula $CF_2=CFOR^3$, wherein $R^3$ is a $C_1$-$C_{12}$ alkyl group, a $C_1$-$C_{12}$ alkoxy group or a $C_1$-$C_{12}$ (per) fluoroalkoxy group; and/or
- monomers of formula $CF_2=CFOCF_2OR^4$, wherein $R^4$ is a $C_1$-$C_6$ fluoro- or perfluoroalkyl group, or a $C_1$-$C_6$ fluoro- or perfluoroalkoxy group.

11. The accumulator according to claim 9, wherein the fluorinated polymer (F) comprises, as membrane repeating units issuing from the polymerization of a fluorinated monomer:
a repeating unit issuing from the polymerization of a monomer in the category of $C_2$-$C_8$ perfluoroolefins and a repeating unit issuing from the polymerization of a monomer in the category of $C_2$-$C_8$ hydrogenated polyolefins.

12. The accumulator according to claim 9, wherein the at least one membrane repeating unit issuing from the polymerisation of a monomer comprising at least one hydroxyl group, optionally in the form of a salt, issues from the polymerization of a monomer of the following formula (IV):

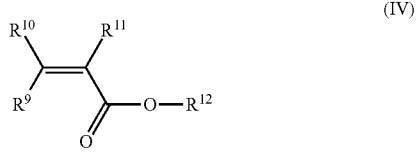

wherein $R^9$ to $R^{11}$ represent, independently of each other, a hydrogen atom or a $C_1$-$C_3$ alkyl group, and $R^{12}$ is a $C_1$-$C_5$ hydrocarbon group comprising at least one hydroxyl group.

13. The accumulator according to claim 9, wherein the fluorinated polymer (F) comprises, as said at least one membrane repeating unit issuing from the polymerization of a monomer comprising at least one hydroxyl group, a repeating unit issuing from the polymerisation of one of the monomers of the following formulae (V) to (VII):

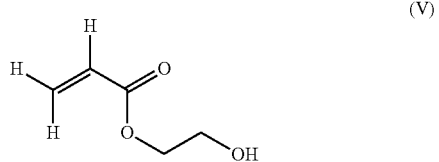

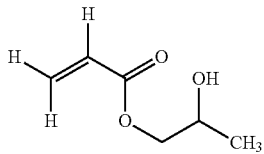

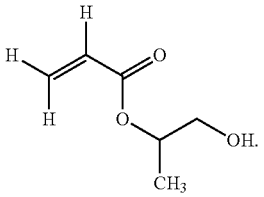

14. The accumulator according to claim 9, wherein the fluorinated polymer (F) is a polymer comprising,
as membrane repeating units issuing from the polymerization of a fluorinated monomer, a repeating unit issuing from the polymerization of a monomer in the category of $C_2$-$C_8$ perfluoroolefins and a repeating unit issuing from the polymerization of a monomer in the category of $C_2$-$C_8$ hydrogenated fluoroolefins and,
as said at least one membrane repeating unit issuing from the polymerisation of a monomer comprising at least one hydroxyl group, a repeating unit issuing from the polymerization of a monomer of formula (IV) as defined in claim 12.

15. An accumulator according to claim 9, wherein the inorganic part formed, at least partly, by one or more oxides of at least one element M chosen from Si, Ti and Zr and the combinations thereof is, in whole or in part, bonded chemically to the organic part via the at least one hydroxyl group.

16. The accumulator according to claim 1, wherein,
the at least one free edge and tongue are covered by the layer of insulating material.

17. A method for preparing an accumulator as defined according to claim 1, comprising a step of assembling the basic elements, which are the bipolar current collector or collectors clad on the two opposite faces, respectively, by a positive electrode and a negative electrode, the number of current collectors to be assembled corresponding to (n–1) with n corresponding to the number of cells of the accumulator, the membranes and the end current collectors clad on one of their faces, in one case with a negative electrode and in the other case with a positive electrode.

18. A method according to claim 17, wherein the various base elements are prepared in advance before assembly.

19. A method according to claim 18, wherein the positive and negative electrodes are prepared by a method comprising the following steps:
(i) the provision of a current collector;
(ii) the provision of a composition comprising
at least one gelling polymer (FF) as defined in claims 1 to 5 above;
at least one active electrode material;
a liquid electrolyte;
optionally, one or more electron-conducting additives;
(iii) the application of the composition of step (ii) to the current collector of step (i), by means of which an assembly results comprising the current collector clad with at least one layer of said composition; and
(iv) the drying of the assembly issuing from step (iii).

20. A method according to claim 18, wherein the membranes are obtained by a method comprising a hydrolysis-condensation step, in the presence of a liquid electrolyte and of a fluorinated polymer (F) as defined in claim 9 above, and of at least one organometallic compound comprising a metal element chosen from Si, Ti, Zr and the combinations thereof.

21. A method according to claim 20, wherein the membranes are produced by a method comprising the following specific steps:

(i) a step of putting at least one fluorinated polymer (F) in contact with:

at least one organometallic compound M1 of the following formula:

$$X_{4-m}AY_m$$

wherein m is an integer ranging from 1 to 3, A is a metal element chosen from Si, Ti, Zr and the combinations thereof, Y is a hydrolysable group and X is a hydrocarbon group comprising at least one isocyanate group —N=C=O;

a liquid electrolyte as defined above;

optionally at least one organometallic compound M2 of the following formula:

$$A'Y'_{m'}$$

wherein m' is an integer ranging from 1 to 4, A' is a metal element chosen from Si, Ti, Zr and the combinations thereof, and Y' is a hydrolysable group;

(ii) a step of reacting at least part of the hydroxyl groups of the fluorinated polymer (F) with at least part of the compound M1 and, optionally, at least part of the compound M2, by means of which a composition is obtained comprising a fluorinated polymer wherein at least part of the hydroxyl groups is transformed into groups of formula —O—CO—NH—Z-AY$_m$X$_{3-m}$, wherein m, Y, A and X are as defined above and Z is a hydrocarbon group comprising optionally at least one group —N=C=O, and optionally at least part of the hydroxyl groups is transformed into groups of formula —O-A'Y'm'-1 wherein A', Y' and m' being as defined above;

(iii) a step of hydrolysis-condensation of the composition obtained at (ii) by means of which an inorganic part of the membranes is formed.

* * * * *